INVENTOR
MILTON EATON

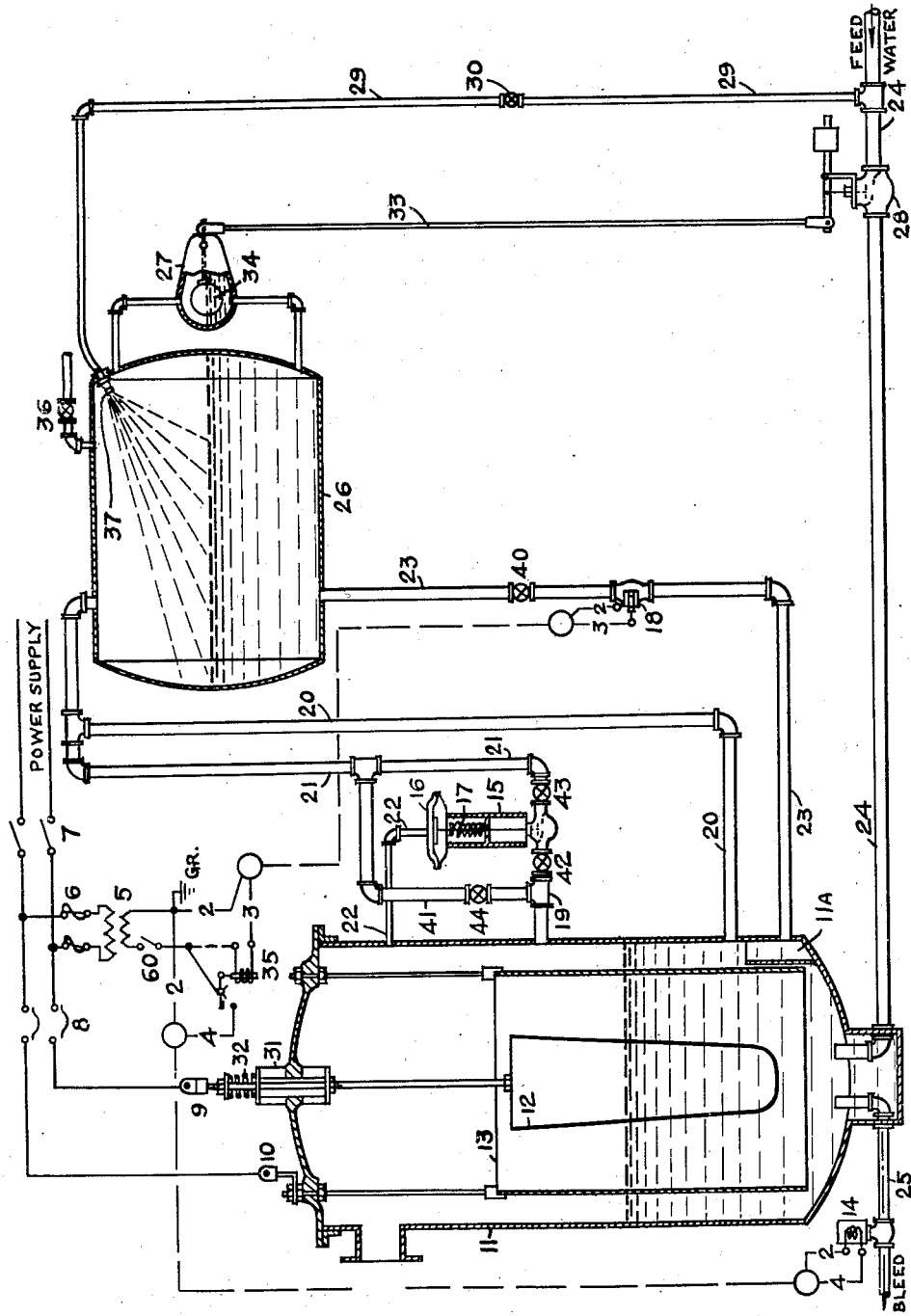

Nov. 9, 1948.                      M. EATON                      2,453,210
                    AUTOMATIC MEANS FOR REGULATING
                       ELECTRIC STEAM GENERATORS
Filed May 25, 1945                                       4 Sheets-Sheet 3

INVENTOR
MILTON EATON
By
Alan Ainsley
ATTORNEY

Patented Nov. 9, 1948

2,453,210

UNITED STATES PATENT OFFICE 2,453,210

AUTOMATIC MEANS FOR REGULATING ELECTRIC STEAM GENERATORS

Milton Eaton, Shawinigan Falls, Quebec, Canada, assignor to The Shawinigan Water & Power Co., Montreal, Quebec, Canada, a corporation of Quebec Application May 25, 1945, Serial No. 595,755
In Canada March 24, 1945

8 Claims. (Cl. 219—40)

This invention relates to improvements in the regulation of electric steam generators of the electrode type.

Objects

It is a principal object of the invention to provide an improved method and means for the automatic regulation of the power input to boilers of this type for the purpose of maintaining a selected condition constant, whereby deviations from the control point are corrected by minimum variation of the controlling medium. A further object of the invention is to provide control apparatus which is simple in construction and operation. Other objects will become apparent from the description to follow.

With these and other objects in view, the present invention is featured by a novel method and means for regulating the boiler pressure or the power input (i. e. the rate of evaporation) is response to variations in the selected conditions (or deviations from the control point of the selected condition) through automatic gradatim variation of the water level on the boiler electrodes. The invention is further featured by improved means for regulating the salt concentration in the boiler water and other improvements which will become evident from the specification.

Detailed description

The invention will be better understood from the following detailed description of preferred embodiments of it, reference being made to the accompanying drawings in which:

Figure 1 is a sectional view of the type of boiler and control apparatus associated with it.

Figure 4:
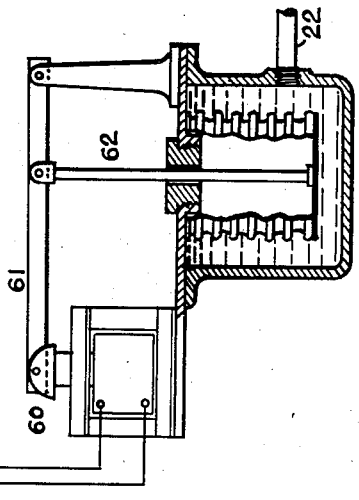
Figure 4 is an enlarged sectional view of the power-to-pressure converter used in the arrangement illustrated in Figure 3.

A sectional view of the type of boiler referred to is shown as 11, Figure 1. It consists essentially of a pressure vessel in which an electrode 12 is located and from which it is insulated by insulator 31. A neutral shell 13 obtains approximately uniform current density on the electrodes and avoids electrolytic corrosion of the outer shell. The boiler feed water is admitted through valve 28 and the stem generated passes through the steam outlet. A single electrode is shown for simplicity with single phase power supply whereas in actual practice electric boilers of this type are built with three electrodes for three phase operation. A similar three phase boiler is shown diagrammatically at 58, Figure 3. Three single phase boilers, as illustrated in Figure 1, may be used as a 3 phase boiler with an electrode connected with each phase and the boiler shells electrically connected to form a neutral. Each phase is regulated as a separate boiler except that control power and other controlling means may be used in common.

Operation in general

The electric current, passing through the water surrounding the electrode, generates heat energy that is dissipated in raising steam. Since the applied voltage is constant, the power input, or rate of evaporation which is directly proportional to the power input, is regulated by varying the current, which is governed by the resistance of its path through the water. This depends on (a) the specific resistance and temperature of the water, (b) the cross-sectional area of the path, and (c) the mean length. The specific resistance depends on the concentration of salts in solution and the cross-sectional area varies with the height of the water on the electrodes. Either of these conditions may be varied and used as a means of control. The power input is proportional to the electrode area immersed and the salt concentration in the water, and varies directly as the water level on the electrodes. The salt concentration tends to increase, due to salts carried into the boiler by the feed water and is held within satisfactory limits by continuous or intermittent bleeding.

The control functions to maintain constant salt concentration and to regulate the controlled pressure by raising and lowering the water level on the electrodes between fixed limits. The salt concentration determines the conductivity of the boiler water. Means is provided to operate the bleed valve for reduction of salt content when the conductivity exceeds a predetermined value and the pressure is normal or high. It is inoperative when the pressure is low.

Control apparatus

The top of an elevated control tank 26, Figure 1, is connected by pipe 21 with a spring loaded pressure reducing valve 15. The opposite side of the valve is connected by pipe 19 with a point on the boiler shell near the top of electrode 12. Reducing valve 15 is held open by a spring 17. Boiler pressure on diaphragm 16, through connection 22, tends to close it. Valve 15 is bypassed by pipe 20 which is connected with the boiler shell at a point near the bottom of electrode 12. The space between the levels of pipes 19 and 20 is the normal range of water level on the electrode.

Figure 2:
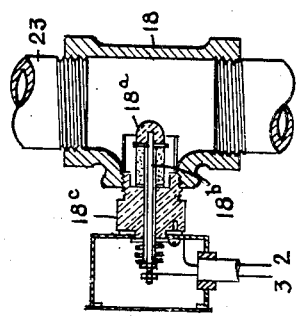
Figure 2 is an enlarged sectional view of the bleed control electrode and auxiliary features forming a part of the apparatus shown in Figure 1.

The bottom of the control tank is connected with the bottom of the boiler by pipe 23 in which valve 40 is located. The pipe 23 thus serves as a water communication allowing water to pass in either direction, i. e. from the control vessel to the boiler or from the boiler to the control vessel. A bleed control electrode, shown in detail, Figure 2, is connected in pipe 23. The essential parts of the bleed control electrode, are the electrode 18a with its connecting rod 18b, which are electrically insulated, and the body or plug 18c which is bored at the inside end to accommodate the insulated electrode and to determine the length of the gap through which the bleed control current passes. One side 3 of the power circuit is connected with the electrode rod and the other side 2 with the grounded plug 18c. Current from power lead 1 passes through the solenoid of current relay 35 to 3, which is connected with the electrode rod. The water between the electrode and plug completes the circuit to ground and back to power lead 2. The amount of current depends on the resistance of the water which is determined by the salt concentration. When this increases to a value depending on the adjustment of relay 35, the relay contacts close to open the bleed valve.

Valve 44 in pipe 41 bypasses valve 15 and may be used for manual control. Valve 44 is normally closed and valves 42 and 43 normally open.

A float chamber 27 is connected with the control tank 26 at its center line. Float 34 is arranged to move up and down as the water level in the control tank rises and falls, and through linkage 33 decreases or increases the opening of feed water regulator valve 28. Pipe 29, in which valve 30 and spray nozzle 37 are located, connects the control tank with feed water pipe 24. Pipe 24 is connected with the boiler and a source of water at a pressure higher than that of the boiler.

A solenoid-operated bleed valve 14 is located in bleed pipe 25. This valve may be motor-operated, or air-operated with a solenoid pilot valve. A transformer 5 is connected through fuse cut-outs 6 to the boiler power supply leads. The low voltage winding supplies the control power through switch 60. The solenoid of the current type relay 35 is connected in series with the bleed control electrode 18 and the control power leads 1 and 2. The normally open contacts of relay 35 are connected in series with the solenoid of bleed valve 14 and control power leads 1 and 2.

*Operation*

In order to simplify description it is assumed the boiler has been put into operation on manual control and that automatic control has been established by closing switch 60. Steam passing through valve 15 to the control tank is condensed at a constant adjustable rate by water admitted through spray nozzle 37. Some steam is also used in supplying radiation losses and in raising the temperature of water taken from the bottom of the boiler with which it is in contact. Assuming normal boiler pressure, as determined by the spring pressure adjustment of valve 15, and water levels as indicated, valve 15 is throttled to pass just enough steam to equal the rate of condensation in the control tank. The steam pressure in the control tank is less than that of the boiler by an amount equivalent to the difference in water levels or static head of water.

Rising boiler pressure increases the steam pressure on diaphragm 16, thus decreasing the opening of valve 15. The rate of admission of steam to the control tank will then be less than the rate of condensation and as the volume of steam in the control tank decreases it is replaced by water drawn from the boiler through 23. As water is taken from the boiler the level on electrode 12 falls causing a decrease in power input and rate of evaporation which returns the pressure to normal.

If the pressure falls below normal the pressure on diaphragm 16 decreases allowing spring 17 to increase the opening of valve 15. Steam will then rise through 21 faster than the rate of condensation in the control tank. This tends to equalize control tank and boiler steam pressures thus allowing water to flow back to the boiler by gravity through 23 at a rate depending on the adjustment of valve 40. This results in rising water level on the electrode with increased power input and rate of evaporation causing the pressures to return to normal.

The rate of transfer of water between control tank and boiler at any instant is determined by the opening of valve 15 and the difference in steam pressures. A momentary rise in boiler pressure increases the difference between boiler pressure and control tank steam pressure. The rise in pressure is transferred through the water column compressing the steam in the control tank and increasing its rate of condensation thus accelerating the rate of transfer of water from the boiler. Similarly a temporary fall in boiler pressure below that of the control tank steam pressure causes water to be returned to the boiler not only by gravity but also by control tank excess steam pressure thus accelerating the rate of rise on the electrodes.

A change in boiler pressure is therefore accompanied by immediate transfer of water in the direction tending to return the pressure to normal and at a rate proportional to the deviation of the pressure from the control point. This effect is independent of the operation of control valve 15 and partly responsible for control stability.

The rate at which water is transferred from the boiler to the control tank, corresponding with the opening of valve 15 and steam pressure differential, depends on the rate of condensation in the control tank or adjustment of valve 30. Similarly the rate of flow from the control tank to the boiler depends on the adjustment of valve 40. The sensitivity of valve 15, i. e. the change in pressure necessary to go from the fully closed to the fully open position or vice versa, is also adjustable. The most satisfactory adjustments depend on characteristics of the system such as inherent steam storage capacity, fluctuations in steam demand, etc. and are found by trial.

Rather than dissipating control-tank-steam by condensation with water admitted through 37, the equivalent result may be obtained by releasing steam through valve 30. This method is preferable when it is convenient to discharge the steam to a system operating at reduced pressure. The adjustment of valve 30 is then made in accordance with conditions as described above for the adjustment of valve 30.

The operation of a simple reducing valve, similar to that illustrated as part 15, is such that the pressure hunts over and under the control point and through an objectionably wide range. This type of valve is illustrated to simplify description. In practice a proportional position type controller is used, that is to say, a controller which maintains a predetermined relation between control valve opening and the deviation of the controlled condition from the control point. One suitable type of proportional position control apparatus is the "Fulscope" controller and "Motosteel" diaphragm valve illustrated in Catalogue 86R, May, 1940 edition (Copyright 1936) and Catalogue 5, September 1941 edition (Copyright 1941) of the Taylor Instrument Companies, Rochester, N. Y.

*Control response*

The boiler pressure is normally higher than the control tank steam pressure by an amount equivalent to the difference in water levels, which is the pressure drop across control valve 15 when the controlled pressure is at the control point. A rise in boiler pressure causes valve 15 to decreases its opening but there is still sufficient passage of steam through it to contribute towards an equivalent rise in control tank steam pressure by an amount depending on the valve throttling range and the time interval. If the boiler pressure falls below that of the control tank steam pressure, valve 15 increases its opening. The control tank steam pressure will fall an amount equal to the decrease in boiler pressure in a time interval depending on the rate at which steam is bled off through valve 36 or condensed by water admitted through spray nozzle 37. The changes in water level on the electrode, for which boiler pressure fluctuations are directly responsible, are therefore proportional to the rate of change in the controlled pressure. The extent of water level change, due to this effect, depends on the steam storage capacity of the control tank and valve adjustments. The steam storage capacity determines the change in volume to which the steam is compressed or expanded to equal the boiler pressure changes and in response to transfer of water from or to the boiler.

According to A. S. M. E. terminology, since the power input is matched with steam demand to maintain constant pressure, the water level on the electrode, or the electrode immersion, which determines the power input, may be regarded as the final control element. Control valve 15, with its associated apparatus, is a proportional-position controller, the operation of which obtains a rate of change in water level proportional to the deviation of the controlled pressure from the control point. In addition controlled pressure fluctuations result in immediate changes in water level on the electrode proportional to the rate and amount of change in the controlled pressure. The operation of regulating valve 15 obtains what is known as proportional-speed-floating controller action. Changing boiler water level, directly responsive to pressure fluctuations, is similar to what is known as "preset" controller action. A regulator with these controller actions is the best obtainable for regulating unstable variables.

Electric boiler pressure is difficult to regulate with fluctuating steam demand mainly on account of low capacity lag, controller lag, and an unfavourable temperature coefficient of water resistance. As the pressure and boiler water temperature rise the conductivity and power input increase thus accelerating the rise in pressure; conversely, falling pressure reduces the power input when an increase is required.

Figure 6:
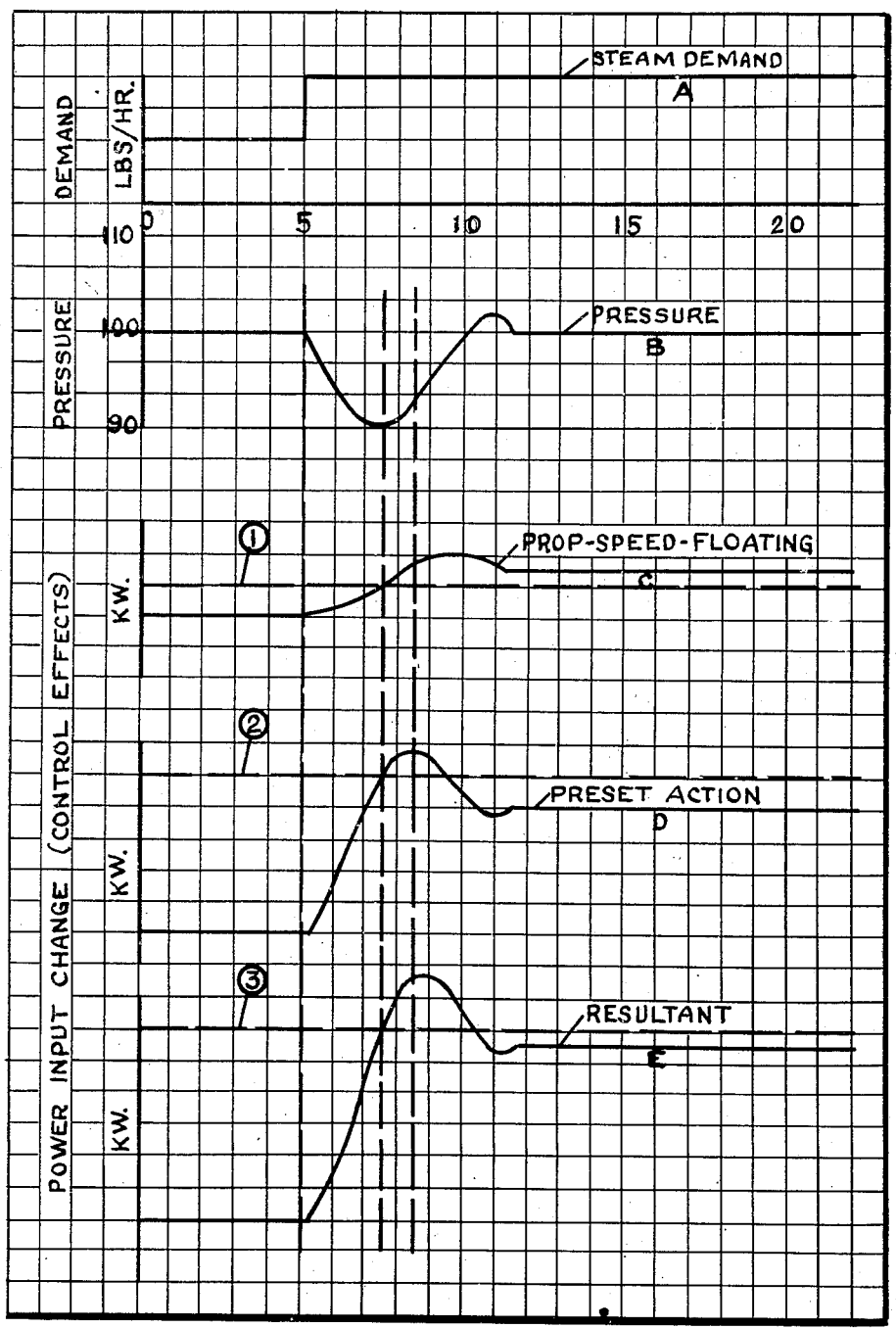
Figure 6 is a graph illustrating the control response according to the invention.

Figure 6 serves to describe the control response graphically. A sudden change in steam demand occurs at time 5 as in curve A. The controlled pressure momentarily falls and is brought back to the control point as in curve B. Curve C shows the increase in power input, occasioned by rising water level on the boiler electrode, due to proportional-speed-floating control alone, while curve D shows that due to "preset controller action" alone. Curve E is the sum of the two control effects.

As indicated by the shape of curve C proportional-speed-floating controller action causes the power input to rise at a rate proportional to the deviation of the controlled pressure from the control point. At time 7½ the pressure begins to rise and consequently any further increase in power input would cause the pressure to overshoot the control point.

The "preset" controller action, curve D, is due to momentary difference between control tank and boiler steam pressures. As the boiler pressure, curve B, falls, water is transferred from the control tank to the boiler by excess control tank steam pressure with consequent rise in power input. When the pressure reaches its lowest value the control tank steam pressure has fallen to near that of the boiler and at time 8½ the boiler pressure begins to exceed the control tank steam pressure by an amount sufficient to cause transfer of water from the boiler to the control tank. The boiler water level therefore falls with resulting decrease in power input, consequently when the pressure reaches the control point, the power input is lower than it was when the pressure was at its lowest value. Lines 1, 2, and 3 indicate power input values at the instant the fall of pressure is stopped.

The sum of these control responses, curve E, shows why the pressure is brought under control without overshooting, thus resulting in control stability.

Similar controller action occurs in the event of an instantaneous decrease in steam demand with momentary rise in controlled pressure.

The control tank is approximately equal in volume to the section of the boiler between the upper and lower water level limits. The sensitivity, or throttling range, of valve 15 is adjusted in service to that at which the most satisfactory operation is obtained. In curve B, Figure 6, the throttling range would be 90 to 110 lbs. The mean pressure is determined by the controller "set point." The control point may be made to approach either the upper or lower limit of throttling range by the adjustment of valve 36, or valve 30. If the rate of dissipation of control tank steam is increased, valve 15 must increase its opening to supply it and to do so the controlled pressure or control point must fall to obtain the necessary controller response. Similarly decreasing the rate of dissipation of control tank steam raises the control point to the throttling range. Curve B, Figure 6, indicates that the control point is on the set point or at the mean pressure. Because the complete controlling means operates as a floating type controller, the control point remains on the set point regardless of steam demand, i. e. there is no "droop" occasioned by change in demand.

Control apparatus and adjustments, as described above, permit the controlled pressure to be held within the throttling range of regulating valve 15 with instantaneous changes in steam demand up to 50% of the boiler capacity and with no steam storage other than what is provided by the boiler itself. Figure 6 illustrates the control response with a change in demand from 50% to 100% of the boiler capacity. Larger load changes may be effected but not without changes in the controlled pressure.

A larger control tank would permit greater instantaneous changes in steam demand, but the permissible range is limited by the time required to transfer water from the boiler to the control tank, or in the reverse direction, to effect water level changes on the electrode. Since this is part of the controlling means the limitation is due to controller lag. It is doubtful that apparatus of this type can be made to hold the pressure under control with instantaneous load changes exceeding 70% of the boiler capacity, or 70% of the load taken at the upper water level which depends on the bleed control point. When it is necessary to accommodate instantaneous load changes exceeding 50% of the boiler capacity supplementary steam storage equipment should be considered.

Boiler water level limit

If the steam demand should exceed the boiler capacity the valve 15 would remain open permitting the boiler to be filled with water. Conversely an abnormally light steam demand would tend to empty the boiler. These conditions would make satisfactory operation impossible were it prevented by the level at which pipe 19 is connected with the boiler shell and the use of the bypass pipe 20. The water level on the electrode cannot fall below pipe 20 because when it reaches this level steam rises through 20, bypassing valve 15, causing water to return from the control tank to the boiler. Similarly when the water level rises to the top of the electrode it seals off pipe 19 and even if valve 15 is open there is no access of steam to the control tank and consequently the upward rise in water level stops.

It is found that air or gas bubbles entering pipe 23 cling to the sides and restrict gravity flow of water from the control tank to the boiler. The baffle 11A in the boiler causes the water entering 23 to flow downwards at a relatively low velocity thus permitting entrained gas bubbles to rise and thus be separated out.

Feed water regulation

The water level control apparatus functions in such a way that all water admitted to the boiler, in excess of that required for the operating water level, is transferred to the control tank. The feed water regulator functions to maintain the control tank half full, thus providing storage water for raising the level in the boiler and space for transfer of water from the boiler to lower the water level.

Float 34 rises and falls with the water level in the control tank and regulates the opening of valve 28 to obtain the mean rate of feed water flow required to maintain the water level as indicated.

A float-operated feed water regulator is illustrated but in actual practice the type used depends on the operating conditions. A float-operated mercury switch connected to start and stop a motor driven pump has been found satisfactory for relatively small boilers. The regulator used for larger boilers included a tube, or concentric tubes, instead of float chamber 27, and depends for its operation on thermal effect. The difference in expansion of the tube, or liquid in the concentric tube, as the water level rises and falls, is used to actuate the regulator valve. A Bailey Thermo-hydraulic feedwater regulator as described in Bulletin No. 83B, Bailey Meter Co., has been found satisfactory.

Bleed control

The bleed control electrode 18, with its assembled parts, constitutes a miniature electric boiler. The water, in which the electrode is immersed, has periodically the same concentration of salts in solution as that of the boiler water and the applied voltage has a fixed ratio with the boiler voltage. Since the bleed control electrode is always completely immersed the current depends entirely on the water conductivity or salt concentration. When this reaches a predetermined value relay 35 closes its contacts to energize bleed valve 14 which opens to bleed off water from the boiler. As bleed water is taken from the boiler it is replaced with relatively pure feed water thus diluting the boiler water and reducing the conductivity to normal at which 14 recloses. The rate of bleed is adjusted so that the bleed valve is open about 50% of the time.

The water in the control tank has lower salt content than that of the boiler because it is diluted by condensed stream; consequently as water is being transferred to the boiler, on fall of pressure, the current taken by bleed control electrode 18 decreases causing relay 35 to open its contacts, if closed, and the bleed through valve 14 to stop. This permits the water level in the boiler to rise faster, and higher conductivity to be maintained, thus facilitating recovery of normal pressure. Similarly the bleed valve tends to open when water is being transferred to the control tank on rise of pressure, thus assisting to restore normal pressure.

Control tank bleed of permanent gases

Steam entering the control tank is condensed and consequently entrained permanent gases tend to accumulate. It has been found that the proportion of air, or permanent gases, in electric boiler steam is about 30 parts per million. Assuming the average steam space in the control tank to be 5 cu. ft. and the rate of condensation 5 cu. ft. per minute, the steam space would be completely filled with gases in 556 hours. This condition is prevented by a continuous bleed of stream and air through air bleed valve 36. A bleed of 1 cu. ft. in 5 minutes would limit the concentration to less than 0.1 percent.

If valve 36 is used to control discharge of steam to a reduced pressure system additional air bleeding is unnecessary.

The air bleed valve functions to limit the concentration of air in the control tank steam just as the boiler bleed valve operates to limit the salt content of the boiler water.

Power input control

Figure 3:
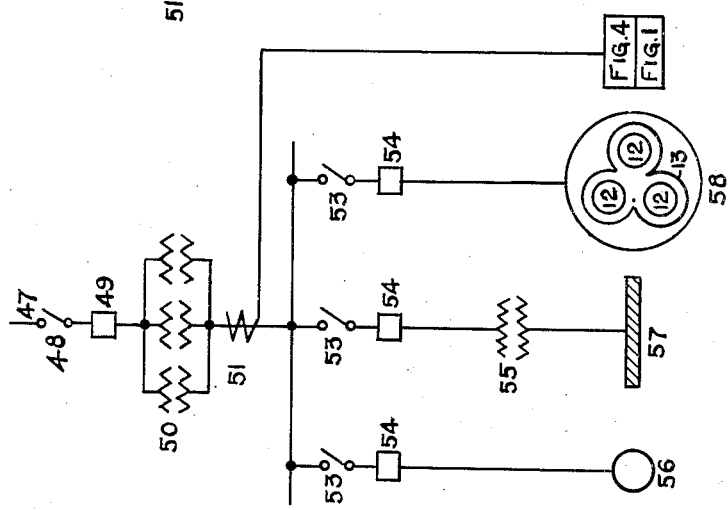
Figure 3 is a schematic diagram illustrating a typical arrangement in which the control apparatus functions to regulate the power input.

Figure 3 illustrates a typical arrangement in which electric boiler 58 is used to maintain constant load of transformers 59. Switches 53 and circuit breakers 54 control three feeders. 56 is a large motor. Transformer 55 reduces the voltage for motor load center 57.

It is assumed the electric boiler is operated in parallel with a coal or oil fired boiler to supply steam for heating purposes. The electric boiler is required to take more power as the motor load decreases and vice versa, while the associated coal or oil fired boiler functions to maintain the steam pressure.

In order to use the electric boiler pressure control, as described above, for this purpose it is necessary to employ a power-to-pressure converter. A device similar in operation to that of the apparatus shown in Figure 4 would obtain the desired result.

The load on transformers 50 is proportional to the secondary current of current transformer 51 which is rectified and passed through the solenoid coil of the device shown in Figure 4. As the current varies the pull on plunger 60 changes accordingly. The pressure resulting from this pull is transferred to the liquid in the pressure chamber through linkages 61 and 62. The pressure element of valve 15, Figure 1, is connected with pipe 22, Figure 4, rather than with the boiler.

The pressure control point of valve or controller 15 is made to correspond with the desired load current through current transformer 51. If the transformer load increases, the solenoid pull and liquid pressure, Figure 4 increase. The control then functions to reduce the electric boiler load, which in turn reduces the transformer load and restores normal liquid pressure. Similarly if the transformer load falls, the boiler control will function to increase the boiler load and restore normal transformer load.

Figure 5:
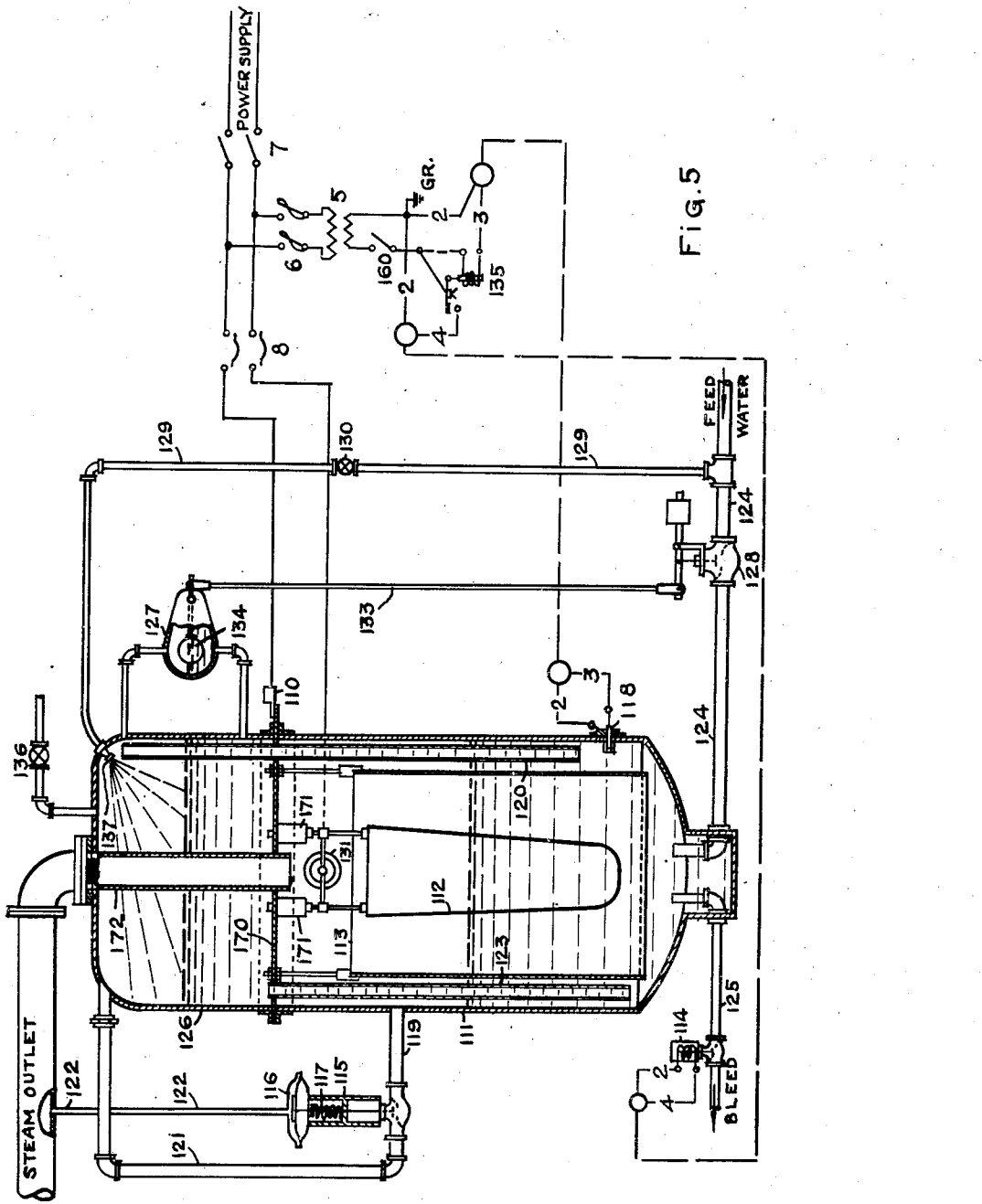
Figure 5 is a sectional view of an electric boiler of which the control tank is an integral part, and of the control apparatus associated with it.

Figure 5 shows another arrangement wherein the control tank is an integral part of the boiler. A diaphragm plate 170, from which electrode 112 is supported by insulators 171, divides the boiler into an upper control tank section and a lower steam generating section. Steam outlet pipe 172 supports the diaphragm plate. The power entrance bushing and insulator 131 is located in the side of the boiler rather than in the top as in Figure 1.

Pipes 120 and 123 are inside the boiler and consequently no valve is shown in pipe 123. This valve is not required if the pipe is the right size for the required rate of flow through it.

Bleed control electrode 118 is located in the side of the boiler instead of in pipe 123 and consequently the operation of the bleed valve depends only on the boiler water conductivity or salt concentration, i. e. it is independent of the controlled condition.

Alternatively pipes 120 and 123 may be located outside the boiler with the valve 140 and electrode 118 connected in pipe 123. The operation would then be the same as described for the arrangement shown in Figure 1.

The diaphragm chamber of valve 115 is connected with the steam outlet pipe rather than directly with the boiler, as in Figure 1. This determines the point at which the stream pressure is controlled. When it is as shown, the controlled pressure is the boiler pressure less the pressure drop in the steam main, which is proportional to the rate of flow of steam or steam demand. Any change in steam demand causes the controlled pressure to change more rapidly and to a greater extent than the boiler pressure thus causing valve 115 to operate before the boiler pressure changes appreciably and in the right direction to hold it under control. This arrangement enables the control to anticipate changes in the controlled condition and to preact in such a way as to minimize them.

It is understood that the response of the valve 115 to the pressure in the steam main is not necessarily limited to the particular apparatus illustrated in Figure 5. It may be for instance employed in connection with the apparatus shown in Figure 1, or in connection with other arrangements. While in the drawings the connection between the valve 115 and the steam line has, for convenience, been shown close to the boiler, it will be understood that this connection may be quite remote from the boiler.

*Modifications*

The various advantages of the method and apparatus disclosed will become apparent to those skilled in the art.

It will also be understood that various additional modifications, to those already mentioned, may be made in the specific embodiments disclosed without departing from the spirit of the invention or the scope of the claims.

I claim:

1. An apparatus for regulating electric boilers of the electrode type to maintain a selected condition constant, comprising the combination of, an electric boiler having at least one electrode therein, a main steam outlet therefrom and a feed water communication thereto, an elevated control pressure-vessel separate from said steam outlet and from said water communication, a water communication between the boiler and the control vessel from locations at least as low as the lowest operating water level in the boiler and in the control vessel respectively and separate from said feed water communication, a control steam bleed communication from the boiler to the control vessel from and to locations at least as high as the highest operating water level in the boiler and in the control vessel respectively, steam dissipating means for dissipating control-vessel-steam, control means for regulating the flow of steam through said control steam bleed communication, control means for regulating said steam-dissipating means, means for measuring the selected condition, one of said control means being responsive to said measuring means, the other control means being adapted to remain in fixed adjustment, an electric power supply for the boiler, a transformer connected with the power supply, an electrode in the water communication between the control tank and the boiler, a current responsive relay connected in series with the electrode in the water communication between the control tank and the boiler and across the secondary leads of the transformer, and a bleed valve connected with the current responsive relay in such a manner that it opens when the relay contacts close and recloses when the relay contacts open.

2. An apparatus for regulating electric boilers of the electrode type to maintain a selected condition constant, comprising the combination of, an electric boiler having at least one electrode therein, a main steam outlet therefrom and a feed water communication thereto, an elevated control pressure-vessel separate from said steam outlet and from said feed water communication, a water communication between the boiler and the control vessel from locations at least as low as the lowest operating water level in the boiler and in the control vessel respectively and separate from said feed water communication, a control steam bleed communication from the boiler to the control vessel from and to locations at least as high as the highest operating water level in the boiler and in the control vessel respectively, steam dissipating means for dissipating control-vessel-steam, control means for regulating the flow of steam through said control steam bleed communication, control means for regulating said steam-dissipating means, means for measuring the selected condition, one of said control means being responsive to said measuring means, the other control means being adapted to remain in fixed adjustment, means for measuring the water level in the control vessel, and controlling means responsive to said water level measuring means for regulating the flow of water through said feed water communication.

3. An apparatus according to claim 2, wherein said measuring means and the control means responsive thereto are constituted by an instrument effective to obtain a rate of change in water level proportional to the deviation of the selected condition from the control point.

4. An apparatus according to claim 2, wherein said steam-dissipating means includes a water inlet at the top of the control vessel, and its control means is a valve controlling said inlet.

5. An apparatus according to claim 2, wherein said steam-dissipating means include a steam outlet from said control vessel, and its control means is a valve controlling said outlet.

6. An apparatus as claimed in claim 2, including a second steam communication between the control vessel above the highest operating water level thereof and a level of the boiler corresponding with a lower limit of water level on the boiler electrodes, said communication by-passing the control means for said first mentioned steam communication.

7. An apparatus, according to claim 2, including means for adjusting the rate of water flow between the control tank and boiler.

8. An apparatus according to claim 2, including conductivity-measuring means for measuring the conductivity of the water in said two-way water communication, a boiler water bleed communication from the boiler, and controlling means for said bleed communication responsive to said conductivity-measuring means.

MILTON EATON.

REFERENCES CITED

The following references are of record in the file of this patent:

UNITED STATES PATENTS

| Number | Name | Date |
|---|---|---|
| 437,551 | Babendreier | Sept. 30, 1890 |
| 450,902 | Winder | Apr. 21, 1891 |
| 1,415,952 | Rogillio | May 16, 1922 |
| 1,665,793 | Sandborgh | Apr. 10, 1928 |
| 1,825,690 | Griffin | Oct. 6, 1931 |
| 2,185,786 | Eaton | Jan. 2, 1940 |
| 2,294,501 | Junkins | Sept. 1, 1942 |
| 2,325,241 | Gilmore | July 27, 1943 |
| 2,395,583 | Saco, Jr. et al. | Feb. 26, 1946 |

FOREIGN PATENTS

| Number | Country | Date |
|---|---|---|
| 374,309 | Great Britain | June 9, 1932 |